(12) United States Patent
Petruchik

(10) Patent No.: US 6,323,928 B1
(45) Date of Patent: *Nov. 27, 2001

(54) METHOD OF FORMING A LIQUID CRYSTAL DISPLAY WITH COLOR DIELECTRIC LAYER

(75) Inventor: Dwight J. Petruchik, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/603,856

(22) Filed: Jun. 26, 2000

(51) Int. Cl.7 .............................. G02F 1/1343; G02F 1/13
(52) U.S. Cl. ............................................. 349/142; 349/187
(58) Field of Search .................................. 349/142, 187, 349/106, 139, 2; 438/30

(56) References Cited

U.S. PATENT DOCUMENTS

| | | | |
|---|---|---|---|
| 4,435,047 | 3/1984 | Fergason | 350/334 |
| 5,437,811 | 8/1995 | Doane et al. | 252/299.01 |
| 5,695,682 | 12/1997 | Doane et al. | 252/299.01 |
| 6,236,442 * | 5/2001 | Stephenson et al. | 349/142 |

FOREIGN PATENT DOCUMENTS

WO 97/04398    2/1997   (WO) .

* cited by examiner

Primary Examiner—William L. Sikes
Assistant Examiner—Tarifur R. Chowdhury
(74) Attorney, Agent, or Firm—Raymond L. Owens

(57) ABSTRACT

A method of forming a display in which images can be selectively presented to a viewer includes providing a transparent substrate; forming a transparent, electrically conductive layer over the transparent substrate; and forming a light modulating layer including liquid crystal material in a polymer binder over the transparent, electrically conductive layer. The method also includes forming color conductive segments over the light modulating layer by directly depositing colored conductive material in an imagewise pattern, the pattern providing viewable and conductive images; forming a color dielectric layer over the color conductive segments and the light modulating layer, the color of the color dielectric layer being selected in relation to the color of the viewable color conductive segments so that when the light modulating layer is effective in a first condition, the viewing of the viewable color conductive segment images is prevented and in a second condition permits the viewing of the viewable color conductive segment images; and providing electrical connections so that an electrical field can be applied across selected ones of such viewable and color conductive segments and the transparent, electrically conductive layer to cause the light modulating layer underlying the selected ones of the viewable and conductive images to change from the first condition to the second condition so as to present such color conductive segment images for viewing by the viewer.

7 Claims, 9 Drawing Sheets

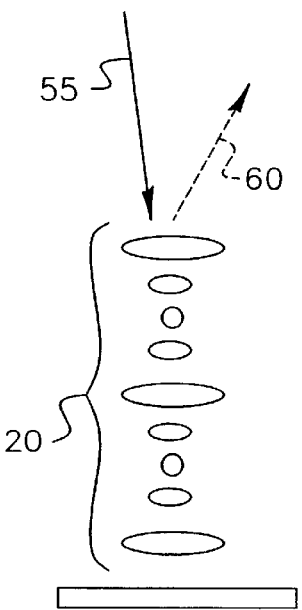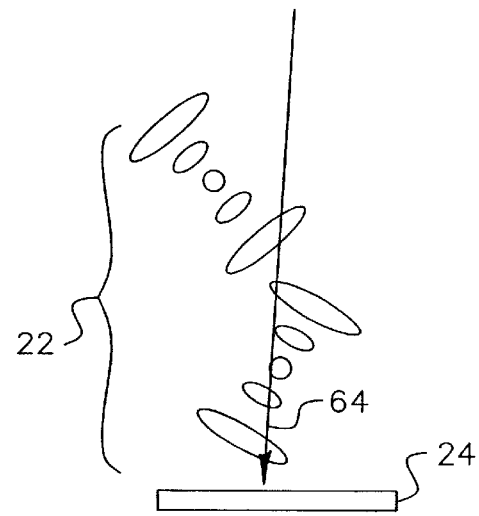
*FIG. 2A*  *FIG. 2B*
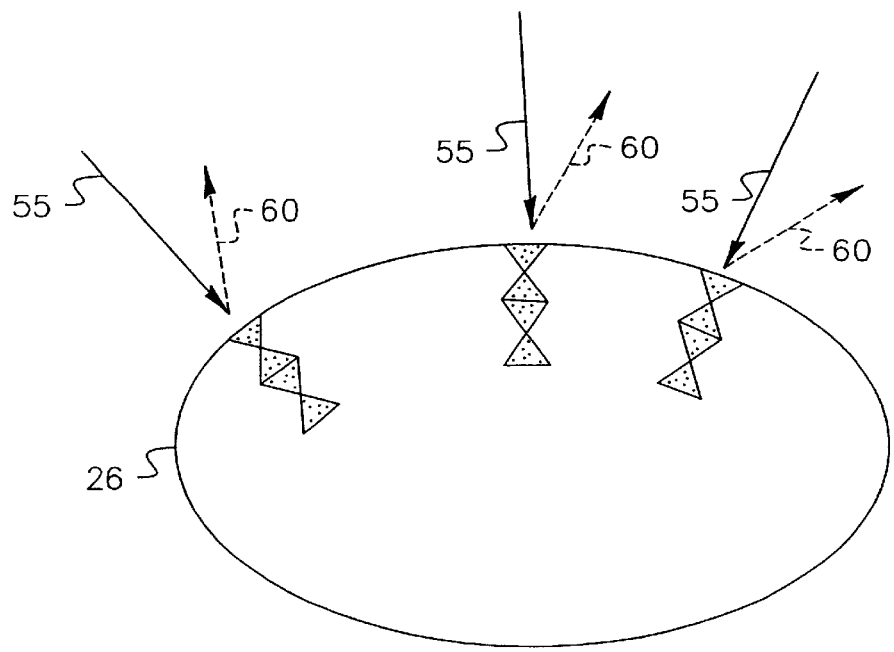
*FIG. 3*

METHOD OF FORMING A LIQUID CRYSTAL DISPLAY WITH COLOR DIELECTRIC LAYER

CROSS REFERENCE TO RELATED APPLICATIONS

Reference is made to commonly assigned U.S. patent application Ser. No. 09/379,776 filed Aug. 24, 1999 and U.S. patent application Ser. No. 09/146,656 filed Sep. 3, 1998, the disclosures of which are incorporated herein by reference.

FIELD OF THE INVENTION

The present invention relates to image displays that can selectively transmit or reflect actinic light.

BACKGROUND OF THE INVENTION

Currently, images can be displayed sheets of paper carrying permanent inks or displayed on electronically modulated surfaces such as cathode ray displays or liquid crystal displays. Sheet materials can carry magnetically written areas carrying ticketing or financial information, however magnetically written data is not visible.

For an example of electronically writable displays, see PCT/WO 97/04398, entitled "electronic Book With Multiple Page Displays." This reference discloses the assembling of multiple electronically written display sheets into a "book", each sheet provided with means to individually address each page. The disclosure sets forth prior art in forming thin, electronically written pages, including flexible sheets, image modulating material formed from a bi-stable liquid crystal system, and thin metallic conductor lines on each page. The device described requires ". . . transparent conducting polymers . . . " formed over the light modulating material. Formation of transparent conductors of the required conductivity require complex vacuum sputtering and photolithographic processes.

Fabrication of flexible, electronically written display sheets is disclosed in U.S. Pat. No. 4,435,047. A first sheet has transparent ITO conductive areas and a second sheet has electrically conductive inks printed on display areas. The sheets can be glass, but in practice have been formed of Mylar polyester. A dispersion of liquid crystal material in a binder is coated on the first sheet, and the second sheet is pressed onto the liquid crystal material. Electrical potential applied to opposing conductive areas operates on the liquid crystal material to expose display areas. The display ceases to present an image when de-energized. The Taliq Company supplied products formed using the two sheet method. Offsetting the two sheets permitted connection to conductive traces on the two sheets.

The prior art typically requires multiple, separate layers to build up the display. The electrical traces and transparent conductive layers are typically formed through repeated vacuum deposition and photolithography of materials on the substrate. These processes are expensive and require long processing times on capital intensive equipment.

The prior art discloses isolating each conductor on separate sides of the display, and connecting the traces to drive electronics using solder connections, wire bonds or pressure contact. Such connections do require that both sets of traces be exposed on a surface for the connection process. The uniform, multi-layer structure prevents connection to the inner conductive layer.

A problem with the prior art is that layers that should not be distinguished frequently are distinguishable and can be seen by a viewer thereby degrading the quality of the viewed image.

SUMMARY OF THE INVENTION

Accordingly, it is an object of the present invention to provide a display which has opaque conductive images formed in an effective manner with a minimum number of steps.

This object can be achieved by a method of forming a display in which images can be selectively presented to a viewer, comprising the steps of:

a) providing a transparent substrate;

b) forming a transparent, electrically conductive layer over the transparent substrate;

c) forming a light modulating layer including liquid crystal material in a polymer binder over the transparent, electrically conductive layer;

d) forming conductive colored segments over the light modulating layer by directly depositing colored conductive material in an imagewise pattern, the pattern providing viewable and conductive images;

e) forming a colored dielectric layer over the conductive colored segments and the light modulating layer, the color of the dielectric layer being selected in relation to the color of the viewable color conductive segments so that when the light modulating layer is effective in a first condition, the viewing of the viewable color conductive segment images is prevented and in a second condition permits the viewing of the viewable color conductive segment images; and f) providing electrical connections so that an electrical field can be applied across selected ones of such viewable and conductive segments and the transparent, electrically conductive layer to cause the light modulating layer underlying the selected ones of the viewable and conductive images to change from the first condition to the second condition so as to present such color conductive segment images for viewing by the viewer.

In one embodiment of this invention the light modulating layer is oriented to a light transmitting state. This is accomplished by heating the light modulating layer to a temperature in a range of 80 degrees C. or higher. In this temperature range the chiral pneumatic material is switched from the planar state reflecting light to the focal-conic light transmitting state.

The disclosed structure has the advantage of presenting esthetically pleasing images to a viewer without the images being adversely affected by a problem of the viewer distinguishing between different colors of different layers in the display.

With the light modulating layer in the light transmitting state, both the conductive colored segments and the colored dielectric layer are viewable. It is desirable to have the conductive colored segments indistinguishable from the colored dielectric layer.

As the light modulating layer is subjected to an electrical field in the regions of the selected conductive colored segments it will cause the light modulating layer to change from a focal conic light transmitting state to a planar state reflecting light in the region of the selected conductive colored segment. In accordance with the invention a display includes two distinguishable colors and is easy to read and discern the intended image. The first distinguishable color is that of the conductive colored segments and the colored dielectric layer. The second distinguishable color is the light modulating layer that has been changed to the planar state reflecting light in the region of the selected conductive colored segment.

BRIEF DESCRIPTION OF THE DRAWINGS

FIG. 2A is a view of the optical characteristics of a chiral pneumatic material in a planar state reflecting light;

FIG. 2B is a view of the optical characteristics of a chiral pneumatic material in a focal-conic light transmitting state;

FIG. 3 is a sectional view of a domain containing chiral pneumatic liquid crystal material;

DETAILED DESCRIPTION OF THE INVENTION

Figure 1A:
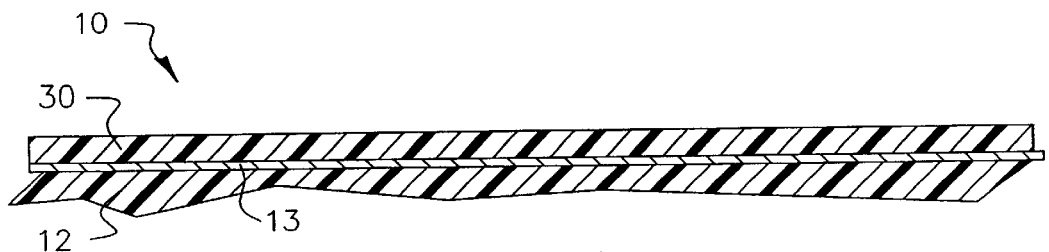
FIG. 1A is a sectional view of an unprocessed sheet used to form a display in accordance with the present invention.

A sectional view of an unprocessed sheet 10 used in the invention is shown in FIG. 1A. The sheet 10 will be processed to form a display 5 in accordance with the present invention. The sheet 10 includes a substrate 12. Substrate 12 can be made of a transparent polymeric material, such as Kodak Estar film base formed of polyester plastic, and have a thickness of between 20 and 200 microns. In an exemplary embodiment, substrate 12 can be a 80 micron thick sheet of polyester film base. Other polymers, such as transparent polycarbonate, can also be used. An optically transparent, electrically conductive layer 13 is formed over the substrate 12. The transparent, electrically conductive layer 13 can be formed of tin-oxide or indium-tin-oxide (ITO), with ITO being the preferred material. Typically, the transparent, electrically conductive layer 13 is sputtered onto the substrate 12 to a resistance of less than 250 ohms per square.

A light modulating layer 30 is formed over the transparent, electrically conductive layer 13. Light modulating layer 30 can be a polymer encapsulated conventional liquid crystal dispersed in a polymeric matrix. The liquid crystal can be a chiral doped pneumatic liquid crystal, also known as cholesteric liquid crystal, such as those disclosed in U.S. Pat. No. 5,695,682. Application of fields of various intensity and duration can change the state of chiral doped pneumatic materials from a reflective to a transmissive state. These materials have the advantage of maintaining a given state indefinitely after the field is removed. Other light reflecting, electrically modulated materials can also be coated such as a micro-encapsulated electrophoretic material. The light modulating layer 30 is effective in two conditions, which will be described in more detail below.

FIG. 2A, and FIG. 2B show states of cholesteric liquid crystals. In FIG. 2A, a high voltage field has been applied and quickly switched to zero potential, which causes the liquid crystal molecules to become switched to a planar light reflecting state 20. Incident light 55 can consist of red, green and blue fractions of white light. The pitch of the molecules can be adjusted to create a Bragg diffraction of reflected light comprised of light of a given color and polarity. In this example, the chirality of the liquid crystals in the planar light reflecting state 20 is adjusted to reflect green light.

In FIG. 2B, application of a lower voltage field has caused molecules of the chiral pneumatic material to form tilted cells that are known as the focal-conic light transmitting state 22. The lower voltage field can progressively drive the molecules of the cholesteric material towards a focal-conic light transmitting state 22. A light absorber 24 can be positioned on the side opposing the incident light. In the fully evolved focal-conic light transmitting state 22, light is transmitted completely and incident light 55 becomes absorbed light 64. The progressive evolution to a completely focal-conic light transmitting state 22 causes a viewer to perceive green light that transitions to black as the cholesteric material changes from a planar to a fully evolved focal-conic state. The transition to the light transmitting state is progressive, and varying the low voltage time permits a variable level of reflection. These variable levels can be mapped out to corresponding gray levels, and when the field is removed, light modulating layer 30 will maintain a given optical state indefinitely. The states are more fully discussed in U.S. Pat. No. 5,437,811.

FIG. 3 is a cross section through a domain 26 containing a cholesteric material. Domain 26 is a spherical domain about 10 microns in diameter, and cholesteric material anchors on the surface of the domain 26. Because the surface of the domain 26 is spherical, incident light 55 from any angle of observation is reflected. The result is that these polymer dispersed (cholesteric) liquid crystals (PDChLC) have good off-axis reflectivity.

In an experiment, E.M Industries cholesteric material BL-118 was dispersed in deionized photographic gelatin. The liquid crystal material was dispersed at an 8% concentration in a 5% deionized gelatin solution. The mixture was homogenized to create 2–10 micron domains 26 of the liquid crystal in aqueous suspension. The material was coated on a photographic film layer machine to provide a 9 micron thick polymerically dispersed cholesteric layer. Other organic binders such as polyvinyl alcohol (PVA) or polyethylene oxide (PEO) could have been used. Such compounds are also machine coatable on equipment associated with photographic films.

Deionized photographic gel is important in providing a binder having low ionic content. The presence of ions in such a binder hinders the development of an electrical field across the dispersed liquid crystal material. Additionally, ions in the binder can migrate in the presence of an electrical field, chemically damaging the light modulating layer 30. The liquid crystal and gelatin emulsion can be coated to a thickness of between 5 and 30 microns to optimize light modulation of the light modulating layer 30. The layer thickness, size of the liquid crystal domains 26 and concentration of the liquid crystal domains 26 are designed to maximize electrical switching of the material and optimize the optical properties of the material in both the planar light reflecting state 20 and focal-conic light transmitting state 22.

Figure 1B:
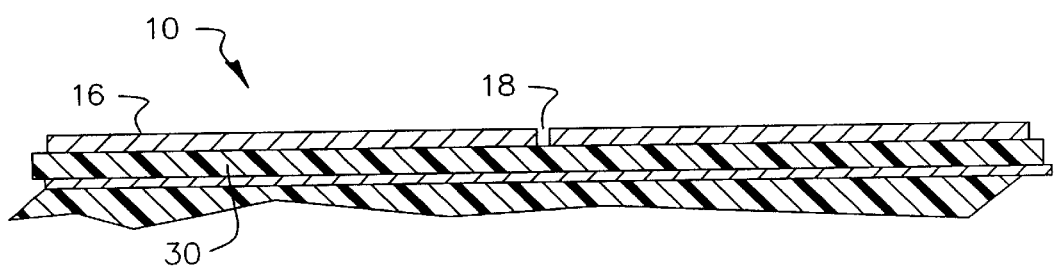
FIG. 1B is a sectional view of the sheet of FIG. 1A after directly forming opaque conductive material in an imagewise pattern.

FIG. 1B is a sectional view through the sheet 10 after being directly printed with an opaque conductive ink to form color conductive segments 16. In an experiment, Electrodag 423SS screen printable opaque electrical conductive material from Acheson Corporation was screen printed to form color conductive segments 16. The color conductive segments 16 are formed over the light modulating layer 30 by directly depositing colored conductive material in an imagewise pattern, the pattern providing viewable and conductive images. The material is finely divided graphite particles in a thermoplastic resin. The material was not heated, only air dried to form a layer between 25 and 75 microns thick. Each color conductive segment 16 was separated from adjacent conductive areas by non-conductive areas 18. Non-conductive areas 18 are typically 50–100 microns wide. Conductive ink can be applied to non-indicia areas so that the layer covers the light modulating layer 30 with the exception of fine traces that are non-conductive areas 18. The effective sheet conductivity of the color conductive segments 16 was less than 250 ohms per square. Color conductive segments 16 were opaque and highly light absorbing, typically having an optical density of greater than 2.0 D to present black images. The light absorbing property of the color conductive segments 16 in the experiment was adequate to serve as light absorber 24 for the cholesteric liquid crystal material. Numerous other techniques will suggest themselves to those skilled in the art. For example, in order to directly deposit conductive inks in an image-wise pattern, screen printing has been found to be highly effective. Alternatively, ink jet printing techniques can be used to form the opaque conductive images. Another technique would be to use off-set printing techniques to directly apply opaque conductive inks in a pattern on sheet 10. The direct depositing of opaque conductive materials in an imagewise pattern means that a single step can be used to provide such images. An advantage of this arrangement is a reduction and simplification of process steps to form such opaque conductive images.

Experimental sheet 10 was tested by applying an alternating 90-volt field at 1 kilohertz frequency for 25 milliseconds to each color conductive segment 16 while transparent, electrically conductive layer 13 was grounded. Light modulating layer 30 over each color conductive segment 16 was driven into a planar light reflecting state 20. A second alternating 40-volt field at 1 kilohertz frequency for 100 milliseconds to each color conductive segment 16 while transparent, electrically conductive layer 13 was grounded. Light modulating material 30 over each color conductive segment 16 switched to a focal-conic light transmitting state 22. The experiment proved that conductive inks could be applied to polymerically dispersed cholesteric liquid crystal material to create a display sheet 10.

Figure 1C:
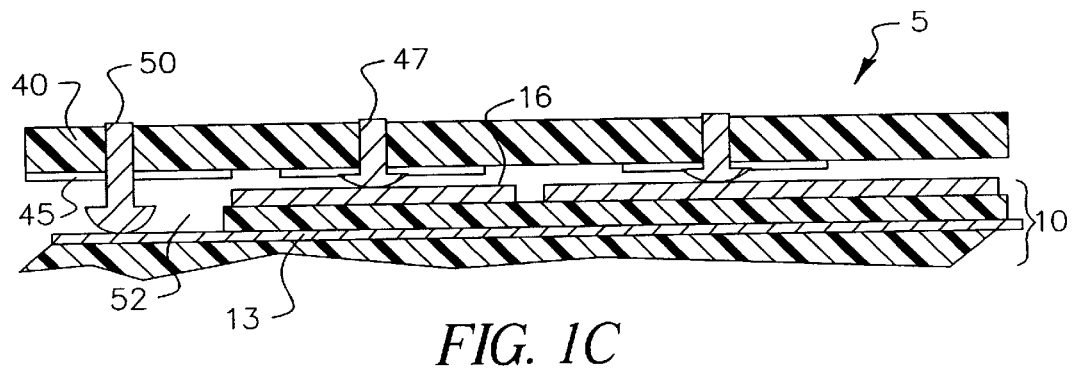
FIG. 1C is a sectional view of the sheet of FIG. 1B connected to a circuit board to form the display in accordance with the present invention.

FIG. 1C is a section view of processed sheet 10 connected to circuit board 40 to form a display 5. Circuit board 40 has a set of traces 45 that are connected to color conductive segments 16 through contact pads 47. In one case, conductive adhesive is provided between circuit board 40 and color conductive segments 16 to form a connection between circuit board 40 and the color conductive segments 16.

A power pin 50 formed in the printed circuit board 40 contacts the transparent, electrically conductive layer 13 through power connection area 52. It should be noted that in power connection area 52, light modulating layer 30 over power connection area 52 prevents direct electrical connection to the transparent, electrically conductive layer 13. The light modulating layer 30 must be removed to allow for direct electrical connection of the power connection area 52 with the transparent, electrically conductive layer 13. Such removal can be accomplished by chemical etching. Alternatively, power pin 50 can have a sharpened point that pierces through light modulating layer 30 to contact transparent, electrically conductive layer 13. Power connection area 52 can be one or more than one area that permit electrical connection to transparent, electrically conductive layer 13.

Figure 4:
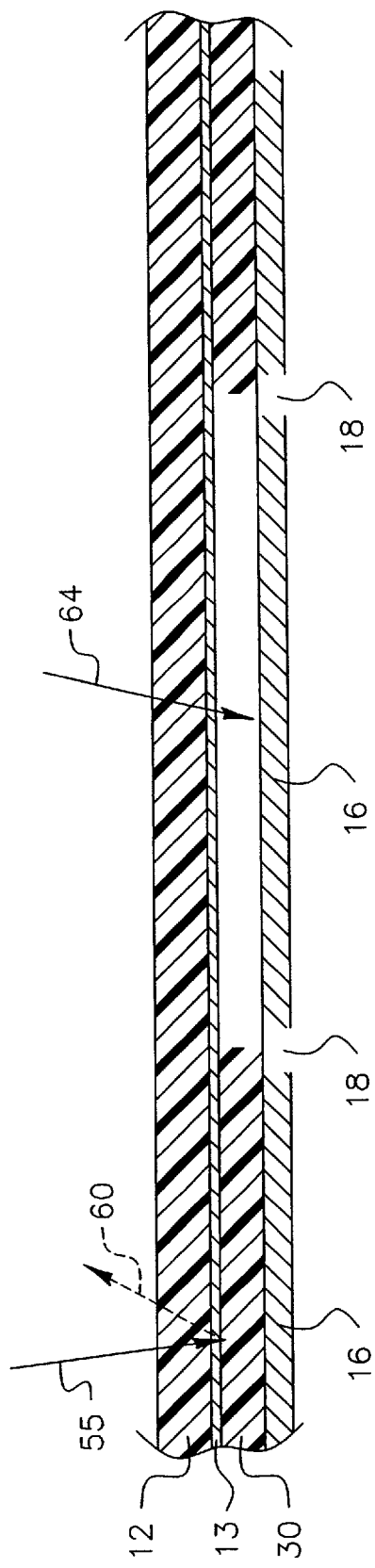
FIG. 4 is a sectional view showing light striking segments of a the display.

FIG. 4 is a drawing of the sheet 10 in both planar light reflecting state 20 and focal-conic light transmitting state 22. In the central area of the drawing, light modulating material 30 has been set to the focal-conic light transmitting state 22. Incident light on that area becomes absorbed light 64. On the left and right sides of sheet 10, light modulating material 30 is in a the planar light reflecting state 20 and portions of incident light 55 be come reflected light 60.

Figure 5:
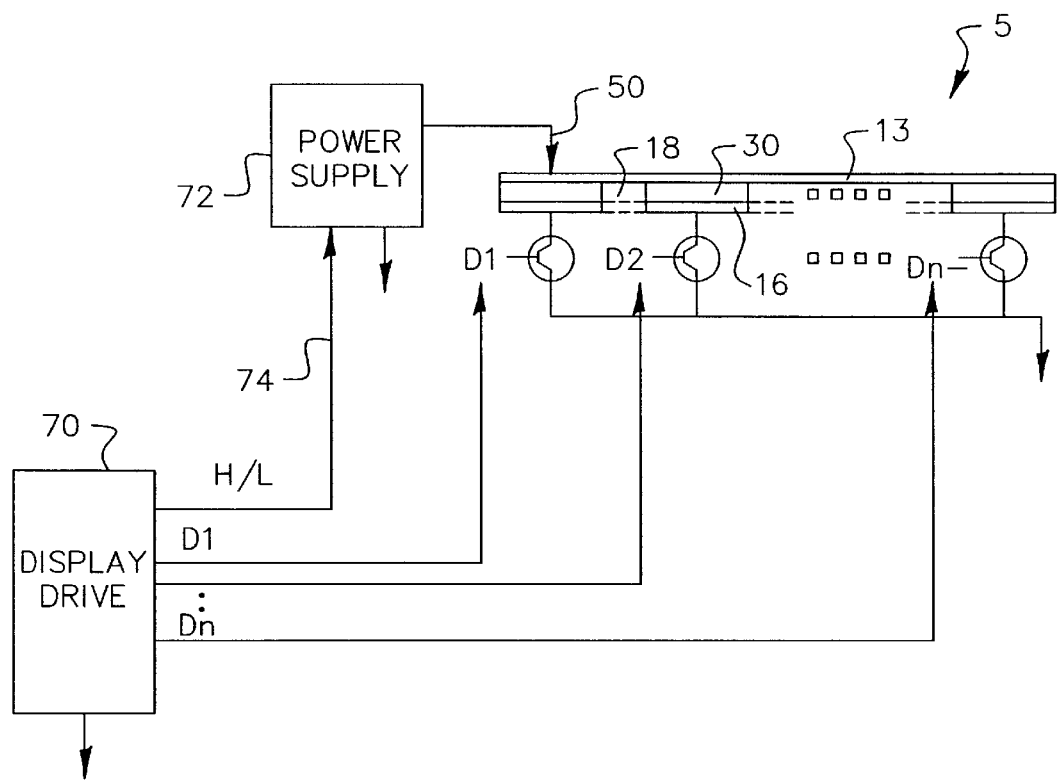
FIG. 5 is a schematic of electrical drive circuitry for the present invention.

FIG. 5 shows the external drive circuitry for changing the state of light modulating layer 30. Display drive 70 is connected to a set of switching elements D1 through Dn, with one switching element per color conductive segment 16. Power supply 72 can provide either 120 volts (high) or 40 volts (low) to the display 5. The voltage is applied as a one kilohertz alternating voltage. The voltage from power supply 72 is connected to the transparent, electrically conductive layer 13 through power pin 50. Display drive 70 grounds all color conductive segments 16 and uses high/low power signal 74 to apply a high, 120 volts filed across light modulating layer 30 for approximately 120 milliseconds. This writes all the color conductive segments 16 into the planar light reflecting state 20, reflecting light. Display drive 70 then grounds those color conductive segments 16 which should be in the focal-conic light transmitting state 22, and uses high-low power signal 74 to apply a low, 40 volt field across the light modulating layer 30 for 120 milliseconds to drive those areas into the focal-conic light transmitting state 22.

Thus, the light modulating layer 30 is driven to two effective conditions. In a first condition, the light modulating layer 30 presents a dark, light absorbing state over color conductive segments 16, and in a second condition, the light modulating layer 30 presents a light, light reflecting surface over color conductive segments 16.

Figure 6A:
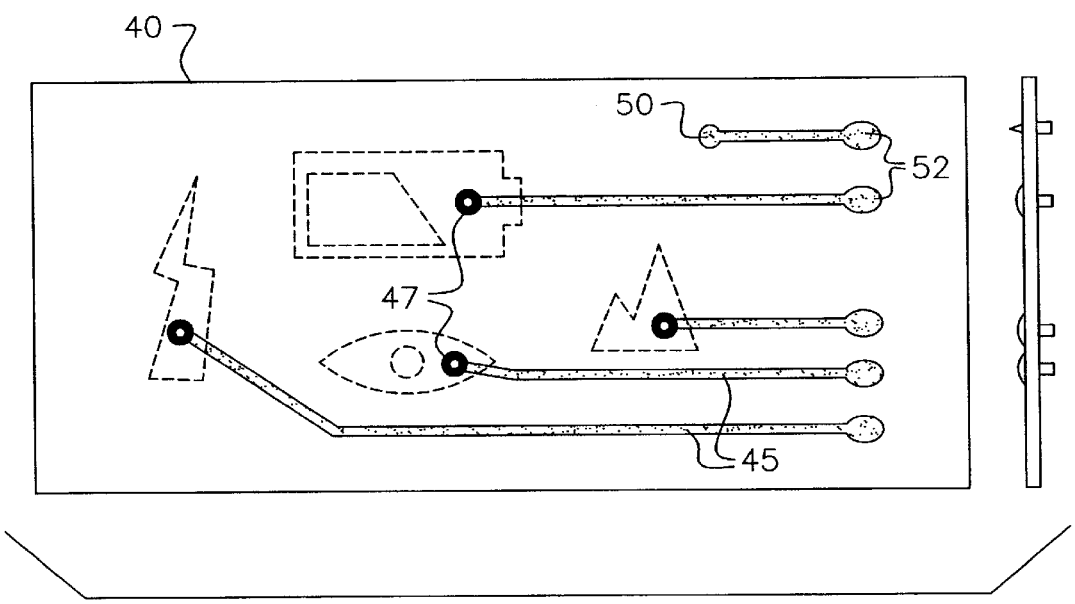
FIG. 6A is a top view of the circuit board of FIG. 1C that is part of the display.
Figure 6B:
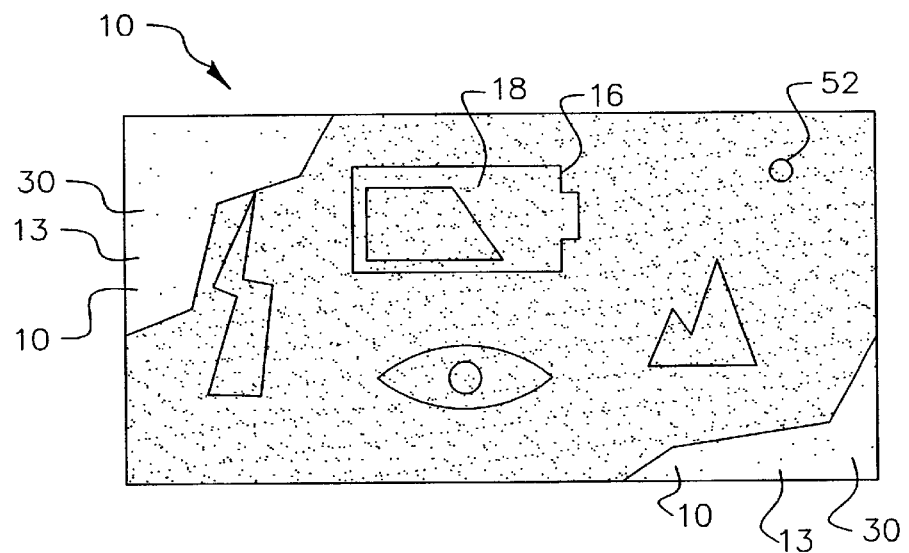
FIG. 6B is a top view with cut away sections of the processed sheet of FIG. 1B that is part of the display.

FIGS. 6A and 6B show top views of each of the two parts of display 5. FIG. 6A shows a circuit board 40, which has circuit board traces 45 running from a position under each color conductive segment 16 to connection areas 52. Contact pads 47 are located under each color conductive segment 16 to provide connection to each conductive trace 45 on sheet 10. FIG. 6B is a top view of sheet 10 with the substrate 12, transparent, electrically conductive layer 13 and light modulating material 30 sectioned away to show color conductive segments 16. Non-conductive areas 18 serve to electrically isolate color conductive segments 16. Power pin 50 on circuit board 40 contacts a connection area 52 transparent, electrically conductive layer 13. Multiple power pins 50 connected to multiple connection areas 52 could be used to ensure uniform electrical field across the transparent, electrically conductive layer 13.

Figure 7A:
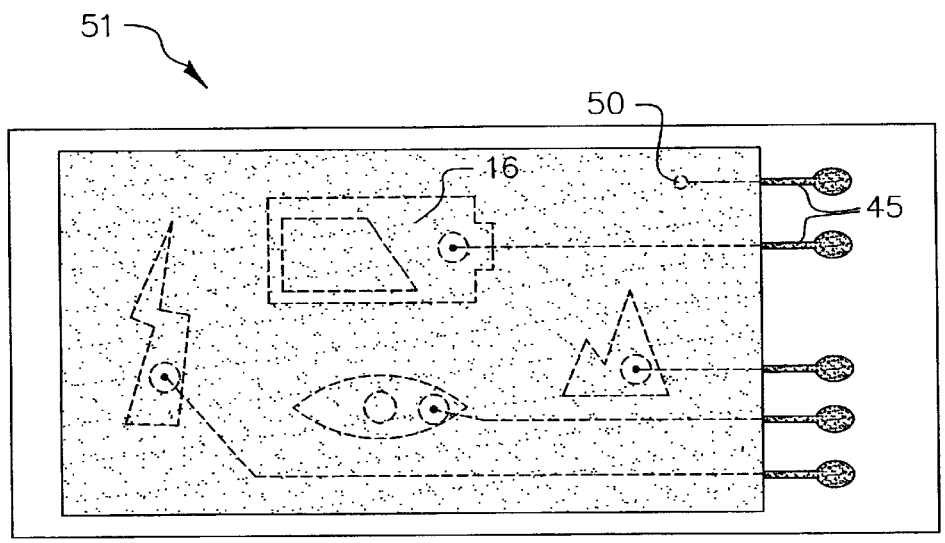
FIG. 7A is a top view of the completed display in an inactivated condition.
Figure 7B:
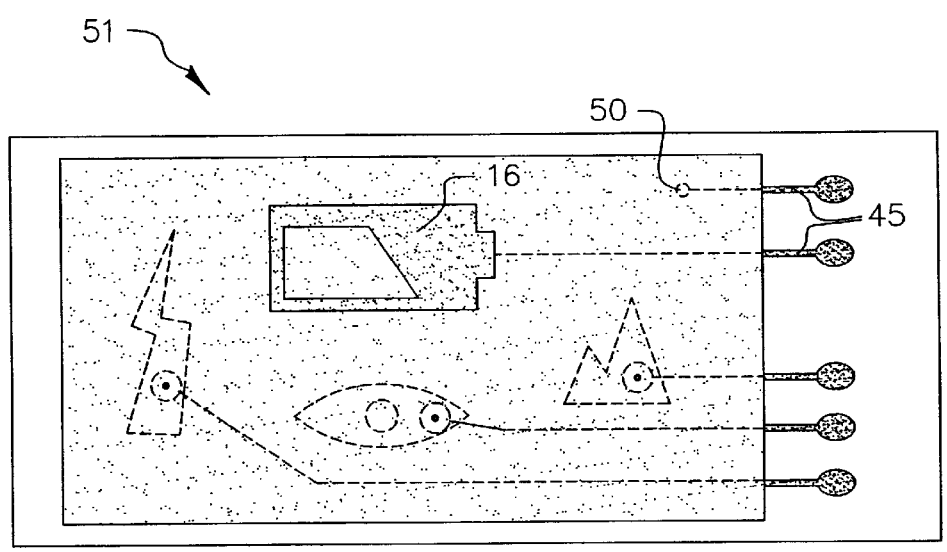
FIG. 7B is a top view of the completed display with an activated segment.

Top views of display 5 are shown in FIGS. 7A and 7B. Sheet 10 from FIG. 6B has been placed over circuit board 40 from FIG. 6A. Circuit board 40 has a series of circuit board traces 45 that provide interconnection to the drive circuit in FIG. 5. FIG. 7A shows all color conductive segments 16 in the light modulating layer 30 have been written into planar light reflecting state 20. FIG. 7B shows a single color conductive segment 16 has been grounded during the low voltage phase of display writing. Light modulating layer 30 in area of the color conductive segment 16 has been switched to the focal-conic light transmitting state 22, and the area over that color conductive segments 16 appears dark due to the light absorbing properties of color conductive segment 16.

Figure 8A:
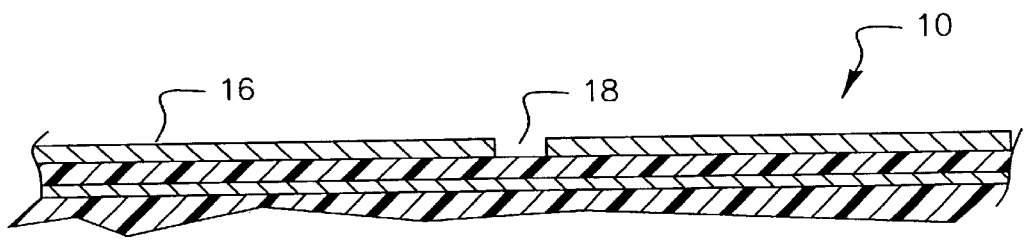
FIGS. 8A–8C are sectional views of the steps in processing a sheet in accordance with the present invention.
Figure 8B:
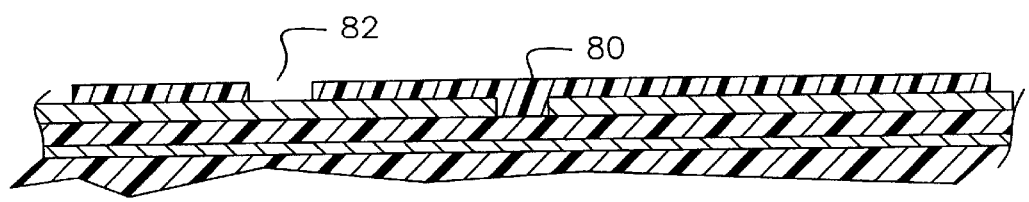
Figure 8C:
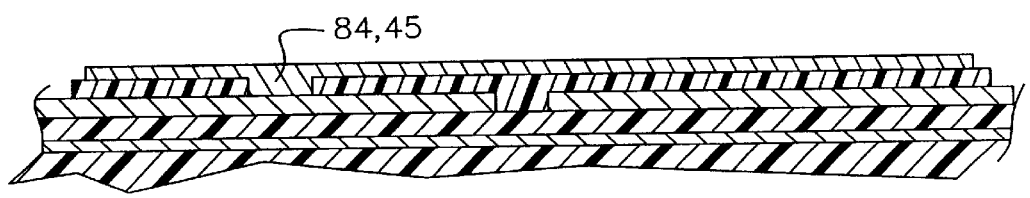
Figure 9A:
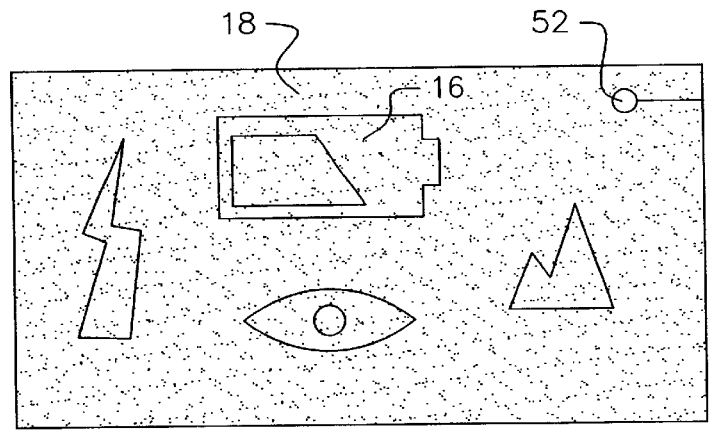
FIGS. 9A–9C are top views of the steps in processing a sheet in accordance with the present invention.
Figure 9B:
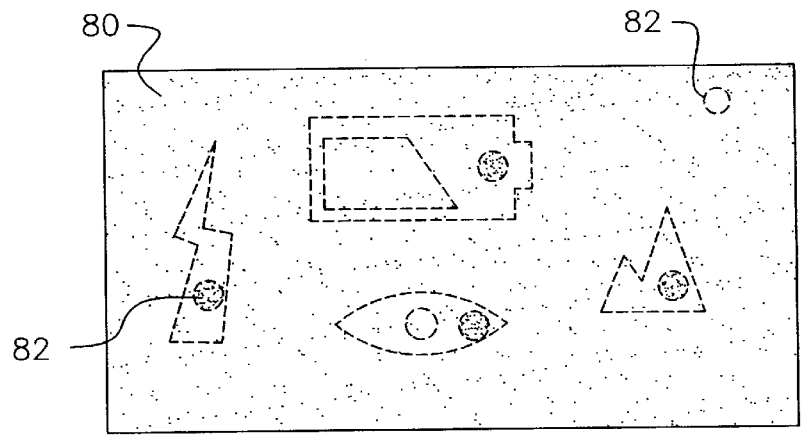
Figure 9C:
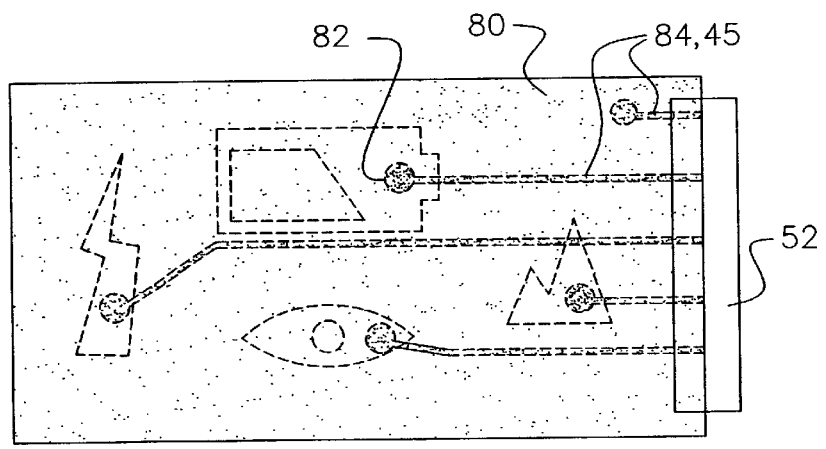

FIG. 8A through FIG. 8C are sectional views and FIG. 9A through 9C are corresponding front views of steps for printing on a sheet 10 in accordance with the present invention. In this arrangement, the circuit board 40 is replaced with a multi layer structure on sheet 10.

FIGS. 8A and 9A show the sheet 10 of FIG. 1B of the earlier embodiment, having color conductive segments 16 and non-conductive areas 18 to delineate color conductive segments 16 to isolate the color conductive segments 16 from adjacent color conductive segments 16. In FIG. 8B and 9B, a non-conductive printed polymer, which is a dielectric, has been applied to sheet 10 to create a color dielectric layer 80 over the color conductive segments 16 and non conductive areas 18. The color dielectric layer 80 is formed over the colored conductive segments 16 and the light modulating layer 30.

Openings or holes 82 are provided in color dielectric layer 80 over each color conductive segment 16. In FIG. 8C and FIG. 9C a second conductive material 84 has been applied over the color dielectric layer 80 to create traces 45 that connect through the holes 82 to the color conductive segments 16 and out to the edge of sheet 10 to power connection areas 52. The resulting sheet 10 does not need the circuit board 40 and associated interconnect structures thereon.

The light modulating layer 30 is oriented to a light transmitting state. This is accomplished by heating the light modulating layer 30 to a temperature in the range of 80 degrees C. or higher. At this temperature range the chiral pneumatic material is switched from the planar light reflecting state 20 to the focal-conic light transmitting state 22. The chiral pneumatic material is now conditioned so that when a field is applied it can be switched between a focal-conic light transmissive state 22 to a planar light reflecting state 20 by the application of an electric field.

With the light modulating layer 30 in the light transmitting state, both the color conductive segments 16 and the color dielectric layer 80 are viewable. It is desirable to have the conductive colored segments 16 indistinguishable from the color dielectric layer 80. The color of the color dielectric layer 80 can be selected in relation to the color of the viewable color conductive segments 16 so that the two layers are indistinguishable.

As the light modulating layer 30 is subjected to an electrical field in the regions of the selected color conductive segments 16 it will cause the light modulating layer 30 to change from a focal conic light transmitting state 22 to a planar light reflecting state 20 in the region of the selected conductive color segment 16.

With this embodiment a display is now made with two distinguishable colors and is easy to read and discern the intended image. The first distinguishable color is that of the conductive colored segments 16 and the color dielectric layer 80, as seen through the focal-conic light transmitting state 22. The second distinguishable color is the light modulating layer 30 that has been changed to the planar light reflecting state 20 in the region of the selected color conductive segment 16.

Figure 10:
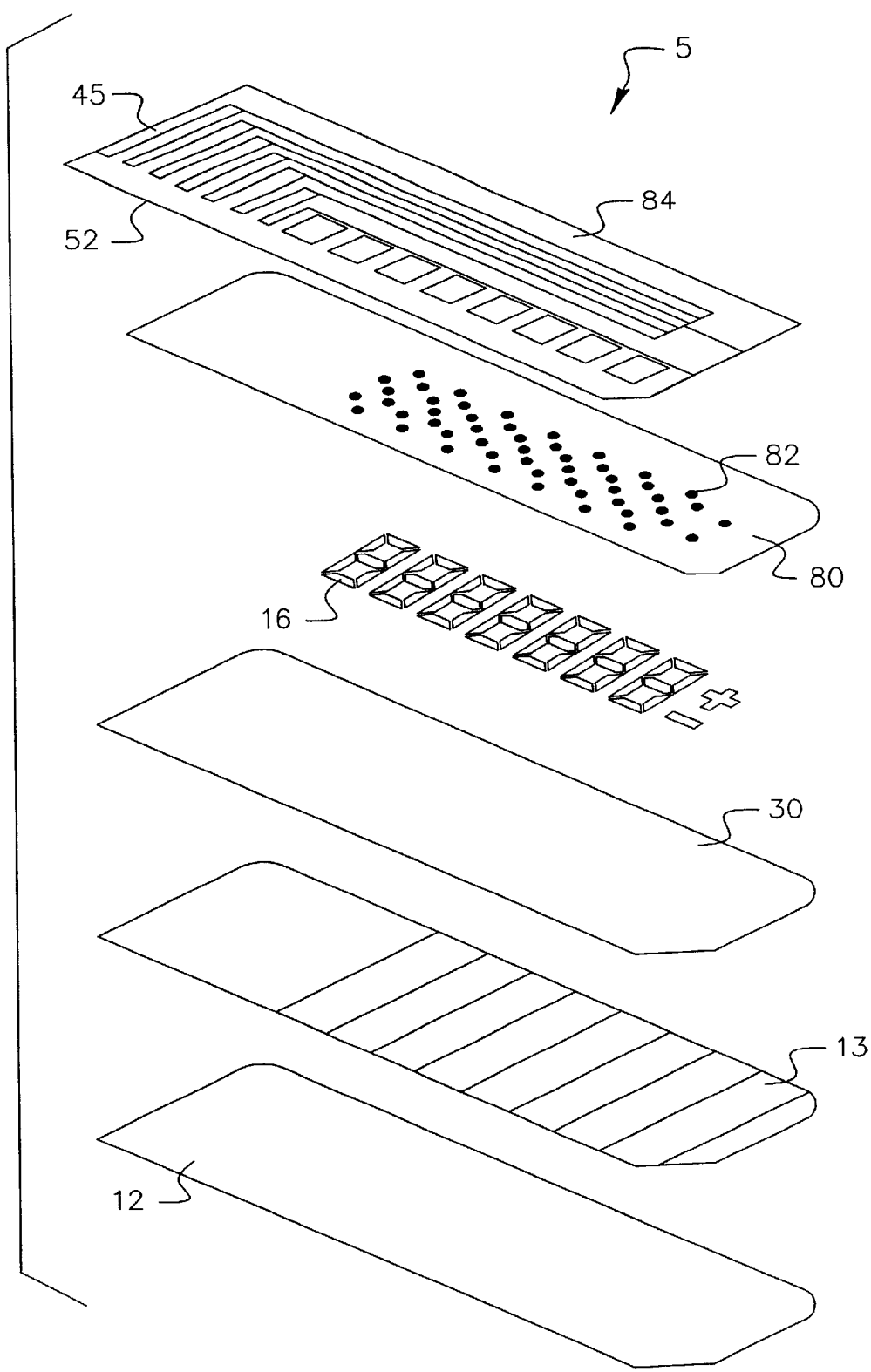
FIG. 10 is an exploded view of an embodiment of the display made in accordance with the present invention.

Referring now to FIG. 10, where a display 5 is shown in accordance with the present invention. Over the substrate 12 is the transparent, electrically conductive layer 13 which can be made of indium-tin-oxide (ITO), this transparent electrically conductive layer 13 is etched by a laser to provide a different electrically conductive portion for a group of color conductive segments 16. The light modulating layer 30, which includes chiral pneumatic liquid crystal material, has been coated on the transparent electrically conductive layer 13. The light modulating layer 30 includes a gelatin into which are dispersed the chiral pneumatic liquid crystal material. At this point in the process of making the display 5 or later the chiral pneumatic liquid crystal material in the light modulating layer 30 is heated so that it is in the focal-conic light transmitting state 22. Patterned color conductive segments 16 are formed on the light modulating layer 30. The color dielectric layer 80 having holes 82, which permit electrical connections, is formed over the color conductive segments 16. The color of the color dielectric layer 80 has been matched to the color of the color conductive segments 16 as discussed above. Second conductive material 84 provides conductive traces 45 which pass through the holes 82 in the color dielectric layer 80 and provides an electrical connection to the color conductive segments 16. The conductive traces 45 route to the edge of sheet 10 to a power connection areas 52. In this way, an electrical field can be applied between across the chiral pneumatic liquid crystal material in the light modulating layer 30 by the application of potential between the color conductive segments 16 and the transparent electrically conductive layer 13.

The invention has been described in detail with particular reference to certain preferred embodiments thereof, but it will be understood that variations and modifications can be effected within the spirit and scope of the invention.

PARTS LIST 5 display
10 sheet
12 substrate
13 transparent, electrically conductive layer
16 color conductive segments
18 non-conductive areas
20 planar light reflecting state
22 focal-conic light transmitting state
24 light absorber
26 domain
30 light modulating layer
40 circuit board
45 traces
47 contact pad
50 power pin
52 power connection area
55 incident light
60 reflected light
64 absorbed light
70 display drive
72 power supply
74 high/low power signal
80 color dielectric layer
82 holes
84 second conductive material
D1, D2, Dn driver 1 through driver n

What is claimed is:

1. A method of forming a display in which images can be selectively presented to a viewer, comprising the steps of:
   a) providing a transparent substrate;
   b) forming a transparent, electrically conductive layer over the transparent substrate;
   c) forming a light modulating layer including liquid crystal material in a polymer binder over the transparent, electrically conductive layer;
   d) forming conductive colored segments over the light modulating layer by directly depositing colored conductive material in an imagewise pattern, the pattern providing viewable and conductive images;
   e) forming a colored dielectric layer over the conductive colored segments and the light modulating layer, the color of the dielectric layer being selected in relation to the color of the viewable color conductive segments so that when the light modulating layer is effective in a first condition, the viewing of the viewable color conductive segment images is prevented and in a second condition permits the viewing of the viewable color conductive segment images; and
   f) providing electrical connections so that an electrical field can be applied across selected ones of such viewable and conductive segments and the transparent, electrically conductive layer to cause the light modulating layer underlying the selected ones of the viewable and conductive images to change from the first condition to the second condition so as to present such color conductive segment images for viewing by the viewer.

2. The method of claim 1 wherein the step of forming the color conductive segments is by screen printing.

3. The method of claim 1 wherein the step of forming the color conductive segments is by using color conductive ink.

4. The method of claim 1 wherein the light modulating material is a cholesteric liquid crystal and the color conductive material is substantially light absorbing to provide a black image.

5. The method of claim 4 wherein the color of the color dielectric layer is black.

6. The method of claim 1 wherein the polymer is included in a gelatin.

7. A method of forming a display in which images can be selectively presented to a viewer, comprising the steps of:
   a) providing a transparent substrate;
   b) forming a transparent, electrically conductive layer over the transparent substrate;
   c) forming a light modulating layer including chiral pneumatic liquid crystal material in a polymer binder over the transparent, electrically conductive layer, wherein prior to use the chiral pneumatic liquid crystal material has been heated so that it can be switched from a planar to a light transmitting state, the chiral pneumatic liquid crystal material being effective in a first condition where the chiral pneumatic liquid crystal material is planar to reflect light and after the application of predetermined heat to change to a second condition where chiral pneumatic liquid crystal material is switched from being planar reflecting light to a focal-conic light transmitting state;
   d) forming conductive colored segments over the light modulating layer by directly depositing colored conductive material in an imagewise pattern, the pattern providing viewable and conductive images;
   e) forming a colored dielectric layer over the conductive colored segments and the light modulating layer, the color of the dielectric layer being selected in relation to the color of the viewable color conductive segments so that when the light modulating layer is effective in the first condition, the viewing of the viewable color conductive segment images is prevented and in the second condition permits the viewing of the viewable color conductive segment images; and
   f) providing electrical connections so that an electrical field can be applied across selected ones of such viewable and conductive segments and the transparent, electrically conductive layer to cause the light modulating layer underlying the selected ones of the viewable and conductive images to change from the first condition to the second condition so as to present such color conductive segment images for viewing by the viewer.

* * * * *

UNITED STATES PATENT AND TRADEMARK OFFICE
CERTIFICATE OF CORRECTION

PATENT NO. : 6,323,928 B1
DATED : November 27, 2001
INVENTOR(S) : Dwight J. Petruchik It is certified that error appears in the above-identified patent and that said Letters Patent is hereby corrected as shown below:

<u>Column 2,</u>
Line 42, "pneumatic" should be corrected to read -- nematic --

<u>Column 3,</u>
Lines 12, 14 and 16, "pneumatic" should be corrected to read -- nematic --
Lines 61 and 65, "pneumatic" should be corrected to read -- nematic --

<u>Column 4,</u>
Line 16, "pneumatic" should be corrected to read -- nematic --

<u>Column 8,</u>
Lines 6, 9, 11 and 26, "pneumatic" should be corrected to read -- nematic --

<u>Column 10,</u>
Lines 7 and 9, "pneumatic" should be corrected to read -- nematic --
Lines 11 & 12, "pneumatic" should be corrected to read -- nematic --
Lines 13 and 16, "pneumatic" should be corrected to read -- nematic --

Signed and Sealed this

Twenty-ninth Day of April, 2003

JAMES E. ROGAN
*Director of the United States Patent and Trademark Office*